(12) United States Patent
Hayashi et al.

(10) Patent No.: US 11,342,580 B2
(45) Date of Patent: May 24, 2022

(54) SOLID ELECTROLYTE FOR ALL-SOLID SODIUM BATTERY, AND ALL-SOLID SODIUM BATTERY

(71) Applicant: UNIVERSITY PUBLIC CORPORATION OSAKA, Osaka (JP)

(72) Inventors: Akitoshi Hayashi, Sakai (JP); Masahiro Tatsumisago, Sakai (JP); Atsushi Sakuda, Sakai (JP)

(73) Assignee: UNIVERSITY PUBLIC CORPORATION OSAKA, Osaka (JP)

( * ) Notice: Subject to any disclaimer, the term of this patent is extended or adjusted under 35 U.S.C. 154(b) by 256 days.

(21) Appl. No.: 16/762,752

(22) PCT Filed: Nov. 5, 2018

(86) PCT No.: PCT/JP2018/041013
§ 371 (c)(1),
(2) Date: May 8, 2020

(87) PCT Pub. No.: WO2019/093273
PCT Pub. Date: May 16, 2019

(65) Prior Publication Data
US 2020/0335815 A1    Oct. 22, 2020

(30) Foreign Application Priority Data
Nov. 10, 2017  (JP) .............. JP2017-217782

(51) Int. Cl.
*H01M 6/18* (2006.01)
*H01M 10/0562* (2010.01)
*H01M 4/58* (2010.01)
*H01M 4/02* (2006.01)

(52) U.S. Cl.
CPC ......... *H01M 10/0562* (2013.01); *H01M 4/58* (2013.01); *H01M 2004/027* (2013.01); *H01M 2004/028* (2013.01)

(58) Field of Classification Search
CPC .............. H01M 10/0562; H01M 4/58; H01M 2004/027; H01M 2004/028
See application file for complete search history.

(56) References Cited

FOREIGN PATENT DOCUMENTS

| CN | 106785010 A | 5/2017 |
| CN | 107482249 A | 12/2017 |
| KR | 10-2017-0112033 A | 10/2017 |

(Continued)

OTHER PUBLICATIONS

Banerjee, A., et al., Angew. Chem. Int. Ed., 55 (2016) 9634-9638. See: Specification; and ISR.

(Continued)

*Primary Examiner* — Jane J Rhee
(74) *Attorney, Agent, or Firm* — Stites & Harbison, PLLC; Jeffrey A. Haeberlin

(57) ABSTRACT

A solid electrolyte for all-solid sodium battery expressed by $Na_{3-x}SbS_{4-x}A_x$, wherein A is selected from F, Cl, Br, I, $NO_3$, $BH_4$, $BF_4$, $PF_6$, $ClO_4$, $BH_4$, $CF_3SO_3$, $(CF_3SO_2)_2N$, $(C_2F_5SO_2)_2N$, $(FSO_2)_2N$, and $[B(C_2O_4)_2]$; and x is 0<x<3.

7 Claims, 6 Drawing Sheets

(56) References Cited

FOREIGN PATENT DOCUMENTS

| KR | 10-2018-0033838 A | 4/2018 |
| KR | 10-2018-0072113 A | 6/2018 |
| KR | 10-2018-0072116 A | 6/2018 |
| KR | 10-1867555 B1 | 6/2018 |
| KR | 10-2018-0080501 A | 7/2018 |

OTHER PUBLICATIONS

Wang, H., et al., Angew. Chem. Int. Ed., 55 (2016) 8551-8555. See: Specification.

SOLID ELECTROLYTE FOR ALL-SOLID SODIUM BATTERY, AND ALL-SOLID SODIUM BATTERY

TECHNICAL FIELD

The present invention relates to a solid electrolyte for all-solid sodium battery and to an all-solid sodium battery. More specifically, the present invention relates to a solid electrolyte with improved ionic conductivity for all-solid sodium battery, and also relates to an all-solid sodium battery including the solid electrolyte.

BACKGROUND ART

In recent years, demand for lithium-ion batteries for storing electric power is growing, which are to be used for automobiles, such as electric vehicles and hybrid vehicles, power-generating equipment, such as solar batteries and wind generator and so forth. However, therefore lithium-ion batteries use lithium whose reserves are small and which is produced in limited areas, and naturally abundant sodium is proposed, in place of lithium, for use in batteries.

From a point of view of assurance of safety, all-solid sodium batteries using a solid electrolyte instead of liquid electrolyte have been actively studied.

From a point of view of improvement of properties of the all-solid sodium batteries, such as discharge capacity, the solid electrolyte is required to have higher ionic conductivity. Particularly from a point of view of improvement of properties of all-solid sodium secondary batteries, such as charging-discharging capacity and cycle number, the solid electrolyte is required to have higher ionic conductivity. As such, A. Banerjee, et al. *Angew. Chem. Int. Ed.* 55. (2016): 9634. (non-patent literature 1) and H. Wang, et al. *Angew. Chem. Int. Ed.* 55. (2016): 9551. (non-patent literature 2) report that $Na_3SbS_4$ exhibits high ionic conductivity as well as high atmospheric stability.

CITATION LIST

Non-Patent Literature

[NPL 1] A. Banerjee, et al. *Angew. Chem. Int. Ed.* 55. (2016): 9634.
[NPL 2] H. Wang, et al. *Angew. Chem. Int. Ed.* 55. (2016): 9551.

SUMMARY OF INVENTION

Technical Problem

The above-described $Na_3SbS_4$ did not have sufficient ionic conductivity, since it was desired to provide a solid electrolyte exhibiting higher ionic conductivity.

Solution to Problem

The inventors of the present invention attempted to substitute an S atom(s) in $Na_3SbS_4$ with a different substance(s). As a result, the inventors found that a solid electrolyte exhibiting a higher ionic conductivity than that of $Na_3SbS_4$ can be provided when a specific substance is one substituted.

The present invention provides a solid electrolyte for all-solid sodium battery expressed by $Na_{3-x}SbS_{4-x}A_x$, wherein A is selected from F, Cl, Br, I, $NO_3$, $BH_4$, $BF_4$, $PF_6$, $ClO_4$, $BH_4$, $CF_3SO_3$, $(CF_3SO_2)_2N$, $(C_2F_5SO_2)_2N$, $(FSO_2)_2N$, and $[B(C_2O_4)_2]$; and x is 0<x<3.

The present invention provides an all-solid sodium battery comprising a positive electrode, a negative electrode and a solid electrolyte layer placed between the positive electrode and the negative electrode, wherein the solid electrolyte layer comprises the solid electrolyte.

Advantageous Effects of Invention

The present invention can provide a solid electrolyte exhibiting higher ionic conductivity and an all-solid sodium battery using the solid electrolyte.

The present invention can provide the solid electrolyte exhibiting the higher ionic conductivity in a case where the solid electrolyte has any of the following features:
(1) A is selected from F, Cl, Br, and I.
(2) x is of a value such that or is a value in such a range that the solid electrolyte exhibits a higher ionic conductivity than that of $Na_3SbS_4$.
(3) A is Cl, and x is a value of 0.01 to 0.12.
(4) A is Br, and x is a value of 0.01 to 0.12.

DESCRIPTION OF EMBODIMENTS

Solid Electrolyte for All-Solid Sodium Battery

Figure 1:
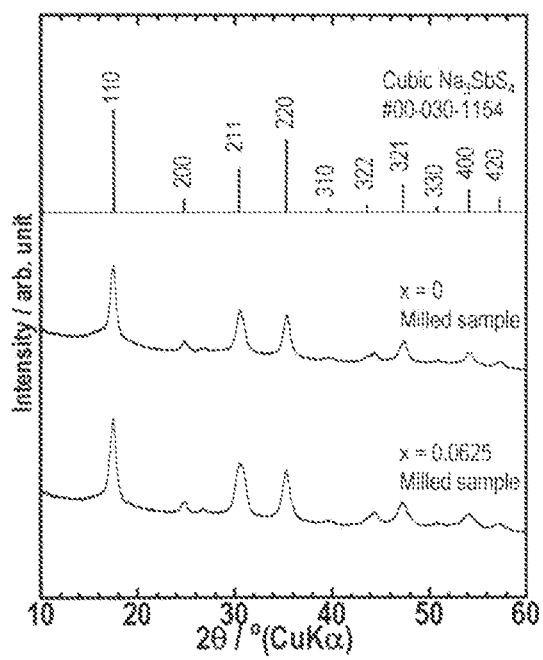
FIG. 1 shows XRD patterns of glass pellets of Example 1 and Comparative Example 1.

A solid electrolyte is expressed by the formula $Na_{3-x}SbS_{4-x}A_x$

In the formula:

A is selected from F, Cl, Br, I, $NO_3$, $BH_4$, $BF_4$, $PF_6$, $ClO_4$, $BH_4$, $CF_3SO_3$, $(CF_3SO_2)_2N$, $(C_2F_5SO_2)_2N$, $(FSO_2)_2N$, and $[B(C_2O_4)_2]$. A may be one kind or may be a combination of two or more kinds. It is preferable that A is selected from the halogen atoms, i.e., F, Cl, Br, and I.

x is 0<x<3. x may be various numerical values, such as 0.001, 0.002, 0.004, 0.006, 0.008, 0.01, 0.012, 0.015, 0.02, 0.05, 0.1, 0.12, 0.25, 0.5, 1.5, 2.5, and 2.9. The range of x varies depending upon the valence of A. It is preferable that x is a range in such a range that the solid electrolyte exhibits a higher ionic conductivity (electrical conductivity) than that of $Na_3SbS_4$. In the case where A is Cl, it is preferable that x is 0.01 to 0.12; and in the case where A is Br, it is preferable that x is 0.01 to 0.12.

The solid electrolyte may be in the form of glass or in the form of glass ceramics. The expression "solid electrolyte in the form of glass" here signifies a solid electrolyte being substantially amorphous. The expression "solid electrolyte being substantially amorphous" includes a solid electrolyte in the 100% amorphous phase as well as a solid electrolyte having crystals microdispersed in amorphous phase. The expression "solid electrolyte in the form of glass ceramics" signifies a solid electrolyte that is formed by heating a glass solid electrolyte at a glass-transition point or higher.

The glass-ceramic solid electrolyte may be in a state in which crystalline phases are dispersed in an amorphous glass phase. Content of the crystalline phase may be 50 mass % or more, or may be 80 mass % or more, with respect to a total amount of the glass-ceramic solid electrolyte. The content of the crystalline phase can be measured by a solid NMR.

The crystalline phase may have a cubic crystal structure and/or a tetragonal crystal structure.

The glass-ceramic solid electrolyte may not have the glass-transition point that the corresponding glass solid electrolyte has.

The above-described solid electrolyte may be formed of one kind or may be formed of a solid electrolyte, or a mixture of two or more solid electrolytes as described above may be used (in an all solid Na battery).

The method for manufacturing the solid electrolyte is not particularly limited, as long as materials thereof can be mixed by the method. As examples of the materials there may be mentioned mixtures of $Na_2S$, $Sb_2S_3$, S, and a sodium salt of A.

For mixing the materials, mechanical milling treatment is preferable in view of mixing the materials more evenly.

A treatment instrument and treatment conditions for the mechanical milling treatment are not particularly limited, as long as the materials can be distributed evenly.

Used as the treatment instrument is normally a ball mill. Ball mills are preferable because high mechanical energy is obtainable from them. Among the ball mills, a planetary ball mill is preferred because the planetary ball mill can efficiently generate high impact energy due to rotation of a pot as well as revolution of a stand plate, which is an opposite direction to the rotation of the pot.

The treatment conditions may be appropriately determined depending upon the treatment instrument to be used. For example, in a case where a ball mill is used, the higher a rotation speed is and/or the longer a treating time is, the more evenly the materials can be mixed. To be more specific, in a case where a planetary ball mill is used, examples of the treatment conditions are as follows: a rotation speed of 50 to 600 rpm; a treating time of 0.1 to 100 hours; and an electric energy of 1 to 100 kWh per 1 kg of the materials.

A glass solid electrolyte is obtained by the above-described mechanical milling treatment. A glass-ceramic solid electrolyte can be obtained by heating the corresponding glass solid electrolyte at the glass-transition point or higher (for example, 100 to 400° C.).

All-Solid Sodium Battery

An all-solid sodium battery may be a primary battery or a secondary battery. In the case of the secondary battery, charging and discharging capacity and/or cycle number can be improved.

The all-solid sodium battery includes positive and negative electrodes and a solid electrolyte layer placed between the positive electrode and the negative electrode.

The solid electrolyte layer contains the above-described solid electrolyte.

The solid electrolyte layer may contain other components, which are used for all-solid sodium batteries, in addition to the above-described solid electrolyte. Examples of the other components include oxides of metals, such as P, Si, Ge, B, Al, Ga, Sn, As, Ti, Fe, Zn, and Bi, and binders, such as polyvinylidene fluoride, polytetrafluoroethylene, polyvinyl alcohol, polyvinyl acetate, polymethyl methacrylate, and polyethylene.

The solid electrolyte may be, for example, pressed so as to form a solid electrolyte layer with a predetermined thickness. The solid electrolyte layer may be, for example, 0.1 to 1 mm in thickness.

The positive electrode is not particularly limited. The positive electrode may be composed of a positive electrode active material only or may contain a positive electrode active material mixed with a binder, an electrical conducting material, an electrolyte, etc.

As examples of the positive electrode active material there may be mentioned Na-containing oxides, such as $Na_4Ti_5O_{12}$, $NaCoO_2$, $NaMnO_2$, $NaVO_2$, $NaCrO_2$, $NaNiO_2$, $Na_2NiMn_3O_8$, $NaNi_{1/3}Co_{1/3}Mn_{1/3}O_2$, $NaFeO_2$, and $NaMn_2O_4$, metal sulfides, such as $Na_2S$, FeS, and $TiS_2$; S; and $Na_3V_2(PO_4)_3$. The positive electrode active material may be coated with a material, such as $NaNbO_3$, $Al_2O_3$, or NiS.

As examples of the binder there may be mentioned polyvinylidene fluoride, polytetrafluoroethylene, polyvinyl alcohol, polyvinyl acetate, polymethyl methacrylate, and polyethylene.

Examples of the electrical conducting material are natural graphite, artificial graphite, acetylene black, Ketjen black, Denka black, carbon black, and vapor-grown carbon fiber (VGCF).

Examples of the electrolyte are electrolytes used in solid electrolyte layers. The solid electrolyte of the present invention may also be used.

The positive electrode can be obtained by, for example, mixing of a positive electrode active material(s), or may be, for example, made of the positive electrode active material optionally mixed with the binder, the electrical conducting material, the electrolyte, etc.; and the obtained product is pressed, obtaining the positive electrode in the form of a pellet.

The negative electrode is not particularly limited. The negative electrode may contain a negative electrode active material only or may contain a negative electrode active material mixed with a binder, an electrical conducting material, an electrolyte, etc.

Examples of the negative electrode active material are metals, such as Na, In, Sn, and Sb; an Na alloy; graphite; hard carbon; and various transition metal oxides, such as $Na_{4/3}Ti_{5/3}O_4$, $Na_3V_2(PO_4)_3$, and SnO.

The binder, the electrical conducting material, and the electrolyte to be contained in the negative electrode may be any of those mentioned in the section above for the positive electrode.

The negative electrode can be obtained by, for example, mixing of a negative electrode active material(s) and optionally a binder, an electrical conducing material, an electrolyte, etc.; and the obtained product is pressing the mixture in to a pellet. Also, in a case where a metal sheet (foil) made of metal or an alloy thereof is used as the negative electrode active material, the sheet may be used as it is.

The positive electrode and/or the negative electrode may be formed on a current collector made of SUS (stainless steel), aluminum, copper, or the like.

The all-solid sodium battery can be obtained, for example, by layering the positive electrode, the solid electrolyte layer, and the negative electrode, and pressing them.

The all-solid sodium battery may have a metal layer placed in between the negative electrode and the solid electrolyte layer and the metal layer may be made of metal selected from Au, Pt, In, Al, Sn, Si, or the like. The all-solid sodium battery may have a metal layer placed between the positive electrode and the solid electrolyte layer.

The metal layer(s) may partly cover the negative electrode and/or the positive electrode; however, it is preferable that the metal layer(s) fully cover the negative electrode and/or the positive electrode in terms of extending a cycle life of the battery.

The metal layer may be formed by a gas phase method. The gas phase method can form the metal layer, as a dense layer with a good adhesion, on a surface of the solid electrolyte layer. This prevents dendrites from being formed by dissolution and deposition of Na during charge and discharge, enabling the cycle life of the battery to be extended. Also, it is preferable that the metal layer is formed in such a way that a surface of the metal layer is less irregular than the surface of the solid electrolyte layer. The metal layer formed in this way can improve the adhesion between the solid electrolyte layer and the negative and/or positive electrode, with the result that the all-solid sodium secondary battery having a long cycle life can be provided.

Examples of the gas phase method are an evaporation method, a CVD method, and a sputtering method. Of these the evaporation method is simple.

A thickness of the metal layer is not particularly limited, as long as reversibility of the dissolution and the deposition of Na can be improved. For example, the thickness may be 0.01 to 10 μm. More preferably the thickness may be 0.03 to 0.1 μm.

EXAMPLES

Hereinafter the present invention will be further described for more detail through the use of Examples and Comparative Example. However, the present invention should not be limited only to these Examples. In the Examples and the Comparative Example to be described below, the following material were used: $Na_2S$ (manufactured by Nagao & Co., Ltd. [purity: >99.1%]), $Sb_2S_3$ (manufactured by Sigma-Aldrich Japan G. K. [purity: >99.995%]), S (manufactured by Sigma-Aldrich Japan G. K. [purity: >99.98%]), NaCl (manufactured by Sigma-Aldrich Japan G. K. [purity: >99.999%]), and NaBr (manufactured by Sigma-Aldrich Japan G. K. [purity: >99.999%]).

Example 1

$Na_2S$, $Sb_2S_3$, S, and NaCl were weighed at a molar ratio of 2.875:1:2:0.125 and were fed into a planetary ball mill. After being fed, $Na_2S$, $Sb_2S_3$, S, and NaCl were subjected to mechanical milling treatment, thereby obtaining $Na_{3-x}SbS_{4-x}Cl_x$ (x=0.0625) glass.

Used as the planetary ball mill was Pulverisette P-7 (manufactured by Fritsch GmbH) having a 45-mL of $ZrO_2$ pot and 2,500 $ZrO_2$ balls (4 mm diameter), in the pot. The mechanical milling treatment was carried out under the following conditions: an amount fed of 2 g; a rotation speed of 210 rpm; room temperature; and 50 hours in a dry argon-filled glove box.

The $Na_{3-x}SbS_{4-x}Cl_x$ (x=0.0625) glass at room temperature (25° C.) was heated at 170° C. or 290° C. for 1 hour, thereby obtaining $Na_{3-x}SbS_{4-x}Cl_x$ (x=0.0625) glass ceramic.

Eighty milligrams of the obtained $Na_{3-x}SbS_{4-x}Cl_x$ (x=0.0625) glass and glass-ceramic were pressed (at a pressure of 360 MPa) at room temperature (about 25° C.) for 0.1 hour, thereby obtaining a glass pellet and a glass-ceramic pellet, respectively, both of the pellets having a diameter of 10 mm and a thickness of about 1 mm.

Example 2

A glass-ceramic pellet of $Na_{3-x}SbS_{4-x}Cl_x$ (x=0.0625) was obtained in the same manner as in Example 1, except that the temperature was changed from room temperature to 170° C. at the time of forming the glass-ceramic, which had been prepared at 170° C., into a pellet.

Comparative Example 1

$Na_3SbS_4$ (x=0) glass and glass-ceramic were obtained in the same manner as in Example 1, except that $Na_2S$, $Sb_2S_3$, and S were weighed at a molar ratio of 3:1:2 and were fed into the planetary ball mill. A glass pellet and a glass-ceramic pellet were then obtained in the same manner as in Example 1.

Discussion (1) XRD Measurements of Glass Pellets of Example 1 and Comparative Example 1

FIG. 1 shows XRD patterns of the obtained two glass pellets. FIG. 1 also shows an XRD pattern of cubic $Na_3SbS_4$. It is found that cubic $Na_{3-x}SbS_{4-x}Cl_x$ is precipitated in Glass Pellets of Example 1 and Comparative Example 1.

(2) Measurements of DTA Curves of Glass Pellets of Example 1 and Comparative Example 1

Figure 2:
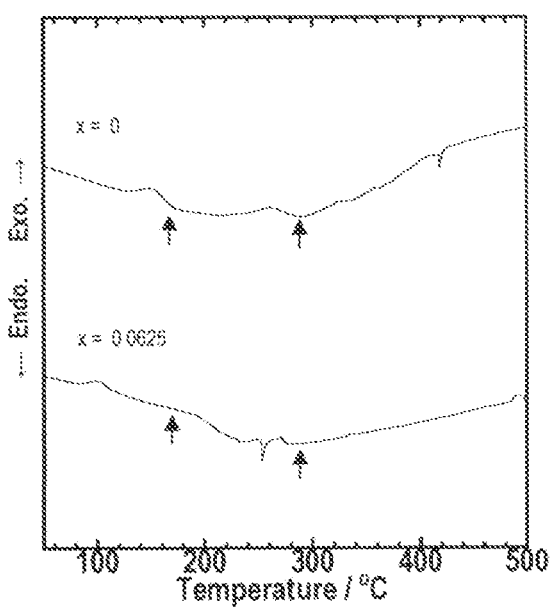
FIG. 2 shows DTA curves of the glass pellets of Example 1 and Comparative Example 1.

FIG. 2 shows DTA curves of the obtained two glass pellets. Arrows in FIG. 2 point at the heating temperatures at which the glass transformed into glass ceramic. These heating temperatures were determined based on peaks of the glass pellet of Comparative Example 1.

(3) XRD Measurements of Glass Pellets and Glass-Ceramic Pellets of Example 1 and Comparative Example 1

Figure 3:
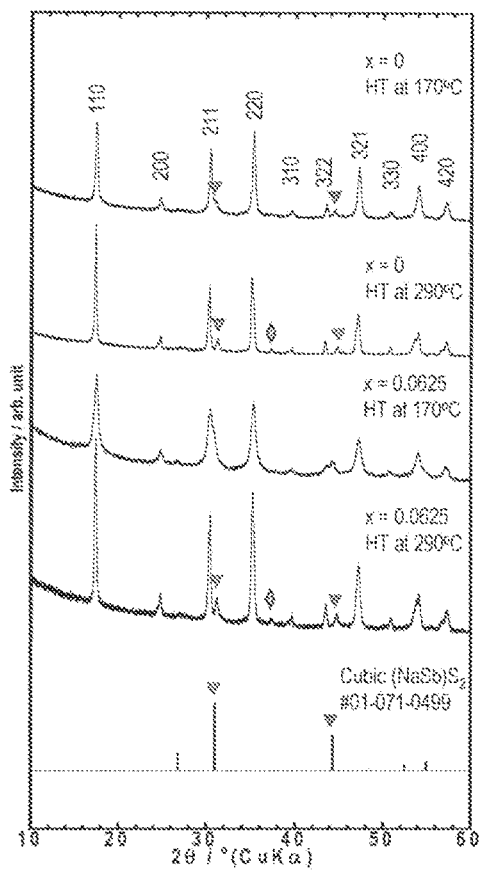
FIG. 3 shows the XRD patterns of a glass pellets of Example 1 and Comparative Example 1 and XRD patterns of glass-ceramic pellets of Example 1 and Comparative Example 1.

FIG. 3 shows XRD patterns of the obtained four glass and glass-ceramic pellets. FIG. 3 also shows an XRD pattern of cubic $NaSbS_2$. It is found from FIG. 3 that cubic $Na_{3-x}SbS_{4-x}Cl_x$ that is high crystalline cubic is precipitated in Pellets of Example 1 and Comparative Example 1 heated at 170° C. It is also found that the cubic $Na_{3-x}SbS_{4-x}Cl_x$ that is high crystalline cubic is precipitated, and tetragonal $Na_{3-x}SbS_{4-x}Cl_x$ is partially precipitated in Pellets of Example 1 and Comparative Example 1 heated at 290° C. (the peaks marked by diamonds in FIG. 3).

(4) Conductivities and Activation Energies of Pellets of Examples 1 and 2 and Comparative Example 1

Table 1 shows conductivities and activation energies of the above-described pellets. In Table 1, "G" signifies a state of glass; and "GC" signifies a state of glass ceramic (the same applies hereinafter).

TABLE 1

| | State | Heating temperature | Heating or no heating at time of preparation of pellet | Conductivity S cm$^{-1}$ | Activation energy kJmol$^{-1}$ |
|---|---|---|---|---|---|
| Comparative Example 1 | G | No heating | No heating: room temperature | 3.3 × 10$^{-4}$ | 31 |
| | GC | 170° C. | No heating: room temperature | 9.4 × 10$^{-4}$ | 26 |
| | GC | 290° C. | No heating: room temperature | 2.4 × 10$^{-4}$ | 28 |
| Example 1 | G | No heating | No heating: room temperature | 1.6 × 10$^{-3}$ | 27 |
| | GC | 170° | No heating: room temperature | 2.6 × 10$^{-3}$ | 23 |
| | GC | 290° C. | No heating: room temperature | 5.0 × 10$^{-4}$ | 27 |
| Example 2 | GC | 170° C. | Heating: 170° C. | 5.3 × 10$^{-3}$ | 23 |

It is found from Example 1 and Comparative Example 1 that the Cl-containing pellets of Example 1 exhibit high conductivities in any of the following states: glass; glass-ceramic (heated at 170° C.); and glass-ceramic (heated at 290° C.). It is found from Example 1 and Example 2 that the pellet heated at the time of the preparation thereof the exhibits a higher conductivity.

Figure 4:
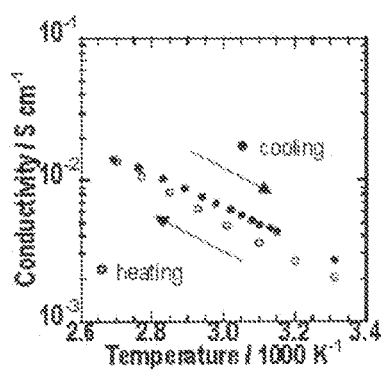
FIG. 4 is a graph showing conductivities of a pellet of Example 1 during the heating-cooling process.
Figure 5:
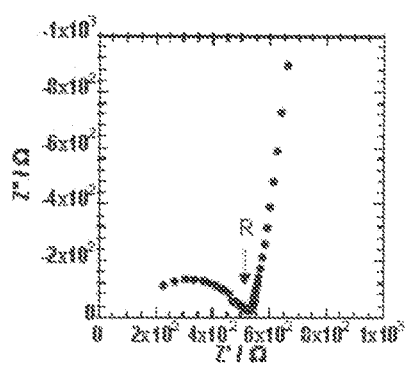
FIG. 5 shows impedance plots of a pellet of Example 1.

(5) Conductivity Plots and Impedance Plots of Pellet of Example 1 During Heating-Cooling Step FIG. 4 and FIG. 5 respectively show conductivity plots and impedance plots of the glass-ceramic pellet of Example 1 during the heating-cooling process, the glass-ceramic being obtained by heating the glass solid electrolyte at 170° C. It is found from FIG. 4 that the conductivity is improved during the cooling. It is found from FIG. 5 that the solid electrolyte can be used for all-solid sodium secondary batteries.

(6) Bulk Densities, Apparent Densities, and Relative Densities of Pellets of Examples 1 and 2 and Comparative Example 1

Bulk densities, apparent densities, and relative densities of the pellets of Examples 1 and 2 and Comparative Example 1 were calculated. The bulk densities were calculated from the weights and volumes of the pellets. The apparent densities were calculated using a dry densimeter (Accu Pyc II 1340: Shimadzu Corporation). The relative densities were calculated as (bulk density)/(apparent density). Calculation results thus obtained are shown in Table 2.

It is found from Example 1 and Example 2 that the pellet heated at the time of the preparation thereof exhibits a high relative density.

(7) SEM Micrographs of Examples 1 and 2

Figure 6:
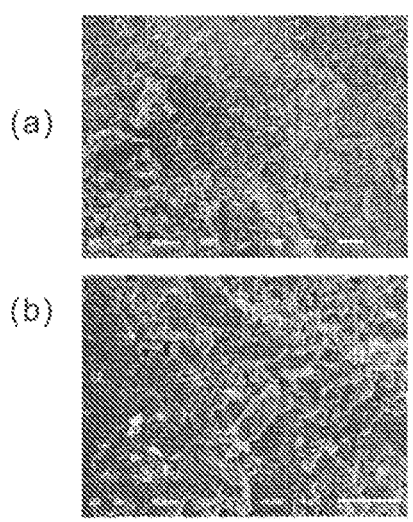
FIG. 6 is SEM micrographs of a glass pellet of Example 1.
Figure 7:
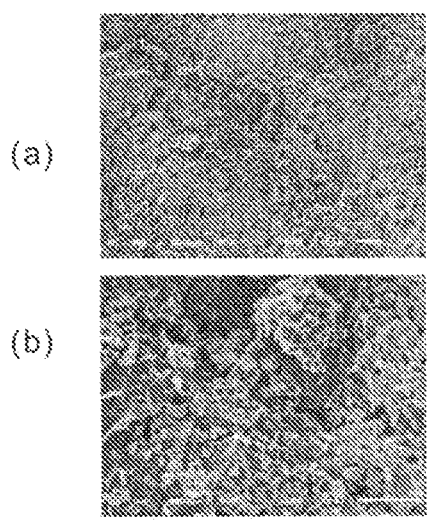
FIG. 7 is SEM micrographs of a glass-ceramic pellet of Example 1 that was heated at 170° C.
Figure 8:
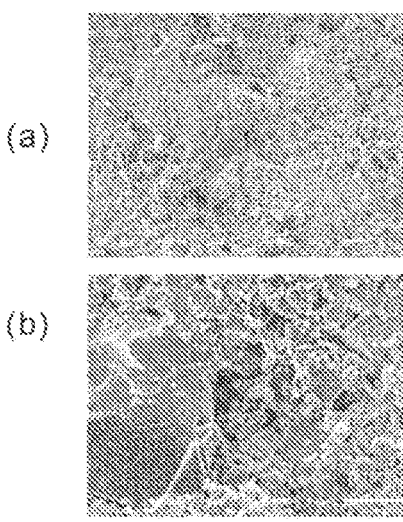
FIG. 8 is SEM micrographs of the glass-ceramic pellet of Example 1 that was heated at 290° C.
Figure 9:
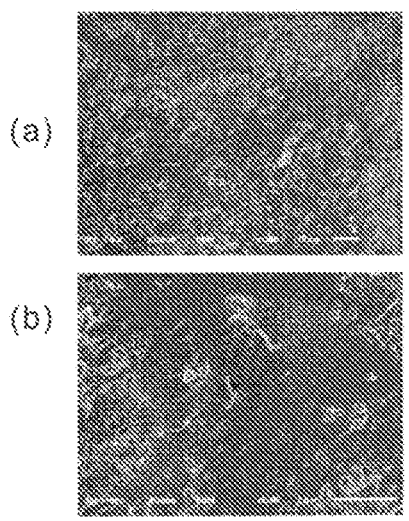
FIG. 9 is SEM micrographs of the pellet of Example 2.

FIG. 6 to FIG. 8 respectively show SEM micrographs of the glass pellet, the glass-ceramic pellet obtained by heating the corresponding glass at 170° C., and the glass-ceramic pellet obtained by heating the corresponding glass at 290° C. of Example 1. FIG. 9 shows SEM micrographs of the pellet of Example 2. In FIG. 6 to FIG. 9, the reference symbol (a) is to show the SEM micrographs magnified 1,000 times; and the reference symbol (b) is to show the SEM micrographs magnified 5,000 times. It is found from these micrographs that the appearances one consistent with the data shown in Table 2 above.

Figure 10:
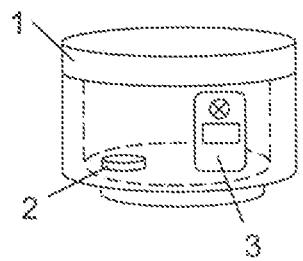
FIG. 10 is a schematic view of the device used for evaluating atmospheric stability of a pellet of Example 1.
Figure 11:
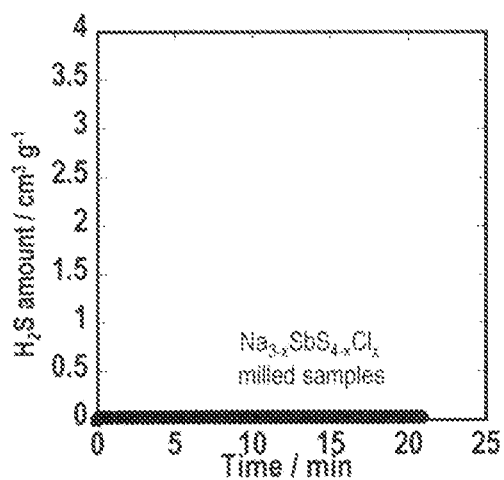
FIG. 11 is a graph showing the amount of $H_2S$ amount in a pellet of Example 1 with time.

(8) Evaluation of Atmospheric Stability of unpressed Na$_{3-x}$SbS$_{4-x}$Cl$_x$ (x=0.0625) Glass-Ceramic of Example 1 obtained by heating at 170° C., illustrated in FIG. 10, about 0.05 g of the above-described Na$_{3-x}$SbS$_{4-x}$Cl$_x$ (x=0.0625) 2 was placed in a 2,000 cm$^3$ desiccator 1 having a capacity of maintained at room temperature (about 25° C.) and at a humidity of 70%. An H$_2$S sensor (GBL-HS manufactured by Ichinen jikco Ltd.) 3 was placed in the desiccator 1 beforehand. An H$_2$S amount in the glass-ceramic was measured with time, and the measurements one plotted in FIG. 11. It is found that the Na$_{3-x}$SbS$_{4-x}$Cl$_x$ (x=0.0625) does not decompose, and hardly generates H$_2$S even after being left in the high-humidity atmosphere for a prolonged time.

TABLE 2

| | State | Heating temperature | Heating or no heating at time of preparation of pellet | Bulk density g/cm$^{-3}$ | Apparent density g/cm$^{-3}$ | Relative density % |
|---|---|---|---|---|---|---|
| Comparative Example 1 | G | No heating | No heating: room temperature | 2.295 | 2.707 | 84.8 |
| | GC | 170° C. | No heating: room temperature | 2.047 | 2.805 | 73.0 |
| | GC | 290° C. | No heating: room temperature | 2.104 | 2.858 | 73.6 |
| Example 1 | G | No heating | No heating: room temperature | 2.280 | 2.711 | 84.1 |
| | GC | 170° C. | No heating: room temperature | 1.743 | 2.818 | 61.8 |
| | GC | 290° C. | No heating: room temperature | 2.434 | 2.859 | 85.1 |
| Example 2 | GC | 170° C. | Heating: 170° C. | 2.713 | 2.818 | 96.3 |

(9) Preparation Example of All-Solid Sodium Secondary Battery

The glass-ceramic solid electrolyte of $Na_{3-x}SbS_{4-x}Cl_x$ (x=0.0625) by heating at 170° C. obtained in Example 1 was used.

An all-solid sodium secondary battery was prepared using an $Na_{15}Sn_4$ alloy as the negative electrode active material, the above-described glass-ceramic solid electrolyte, and $TiS_2$ as the positive electrode active material.

Figure 12:
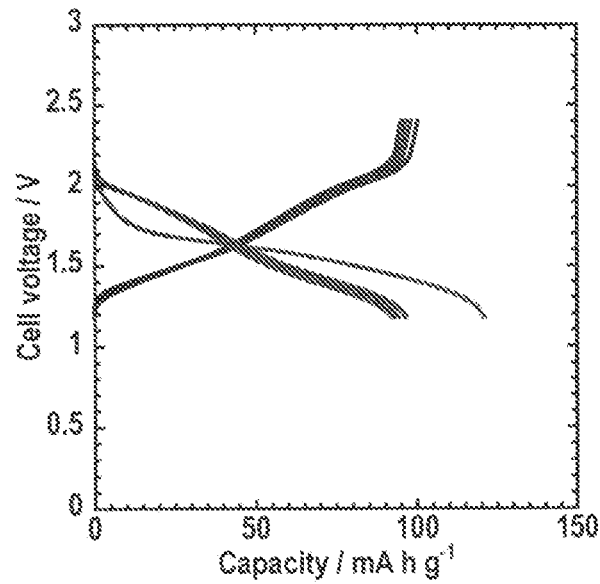
FIG. 12 is a graph showing charge-discharge behaviors of an all-solid sodium battery containing a solid electrolyte of Example 1.

The all-solid sodium secondary battery obtained thereby was subjected to charge and discharge cycles at room temperature, at a current density of 0.013 mAcm$^{-2}$, and at a cut-off voltage of 1.17 to 2.40 V; and FIG. 12 shows charge-discharge curves obtained from the battery. While being subjected to 5 charge and discharge cycles, the prepared battery retained a capacity of about 100 mA h g$^{-1}$ with respect to the weight of $TiS_2$. It is found that the glass-ceramic solid electrolyte of $Na_{3-x}SbS_{4-x}Cl_x$ (x=0.0625) can be used as a solid electrolyte for all-solid sodium secondary batteries.

Example 3

A glass-ceramic pellet of $Na_{3-x}SbS_{4-x}Cl_x$ (x=0.125) was obtained in the same manner as in Example 1, except that $Na_2S$, $Sb_2S_3$, S, and NaCl were weighed at a molar ratio of 2.75:1:2:0.25; and the heating temperature was 290° C.

Example 4

A glass-ceramic pellet of $Na_{3-x}SbS_{4-x}Br_x$ (x=0.0625) was obtained in the same manner as in Example 2, except that $Na_2S$, $Sb_2S_3$, S, and NaBr were weighted at a molar ratio of 2.875:1:2:0.125.

Discussion

(1) XRD Measurement of Glass-Ceramic Pellet of Example 3

Figure 13:
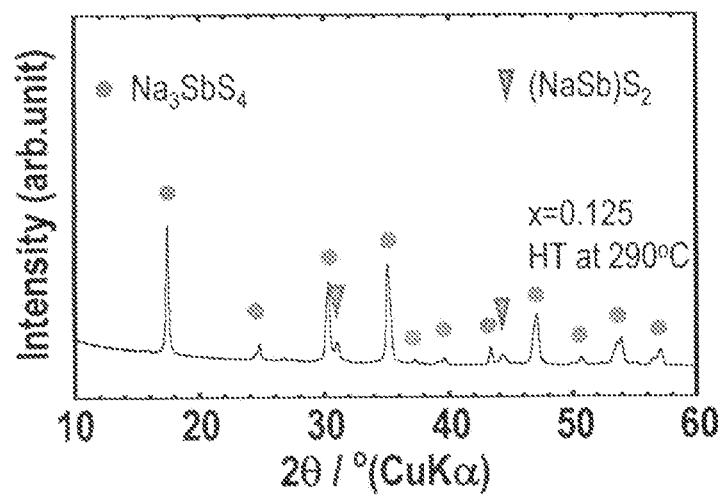
FIG. 13 shows an XRD pattern of a glass-ceramic pellet of Example 3.

FIG. 13 shows an XRD pattern of the glass-ceramic pellet of Example 3. It is found from FIG. 13 that cubic $Na_{3-x}SbS_{4-x}Cl_x$ is mainly precipitated (marked by "•" in the figure).

(2) Conductivities of Pellets of Examples 3 and 4

Conductivities of the above-described pellets are shown in Table 3.

TABLE 3

| | State | Heating temperature | Heating or no heating at time of preparation of pellet | Conductivity S cm$^{-1}$ |
|---|---|---|---|---|
| Example 3 | GC | 290° C. | No heating: room temperature | 4.5 × 10$^{-4}$ |
| Example 4 | GC | 170° C. | Heating: 170° C. | 1.4 × 10$^{-3}$ |

It is found from Example 3 that the pellet containing Cl (x=0.125) is lower in conductivity than the pellet containing Cl (x=0.0625), but is higher than the pellet of Comparative Example 1.

(3) Conductivity Plots of Pellet of Example 4

Figure 14:
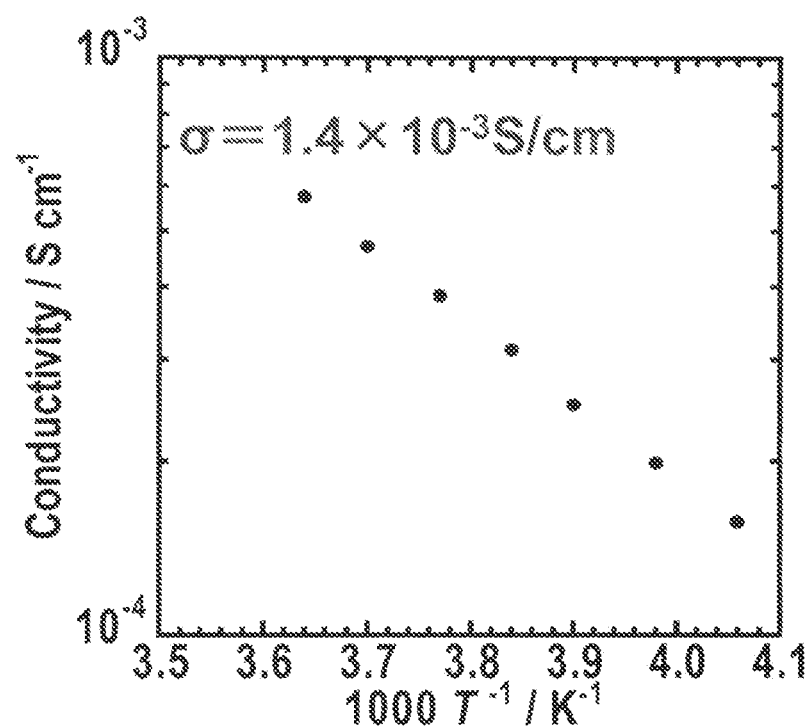
FIG. 14 is a graph showing conductivities of a pellet of Example 4.

FIG. 14 shows conductivity plots of the glass-ceramic pellet of Example 4. It is found from FIG. 14 that this pellet exhibits a high conductivity at room temperature.

REFERENCE SIGNS LIST

1 Desiccator
2 $Na_{3-x}SbS_{4-x}Cl_x$ (x=0.0625)
3 $H_2S$ sensor

The invention claimed is:

1. A solid electrolyte for all-solid sodium battery expressed by $Na_{3-x}SbS_{4-x}A_x$, wherein
A is selected from F, Cl, Br, I, $NO_3$, $BH_4$, $BF_4$, $PF_6$, $ClO_4$, $BH_4$, $CF_3SO_3$, $(CF_3SO_2)_2N$, $(C_2F_5SO_2)_2N$, $(FSO_2)_2N$, and $[B(C_2O_4)_2]$; and
x is 0<x<3.

2. The solid electrolyte for all-solid sodium battery according to claim 1, wherein A is selected from F, Cl, Br, and I.

3. The solid electrolyte for all-solid sodium battery according to claim 1, wherein x is of a value such that or is a value in such a range that the solid electrolyte exhibits a higher ionic conductivity than that of $Na_3SbS_4$.

4. The solid electrolyte for all-solid sodium battery according to claim 1, wherein A is Cl, and x is a value of 0.01 to 0.12.

5. The solid electrolyte for all-solid sodium battery according to claim 1, wherein A is Br, and x is a value of 0.01 to 0.12.

6. An all-solid sodium battery comprising a positive electrode, a negative electrode and a solid electrolyte layer placed between the positive electrode and the negative electrode,
wherein the solid electrolyte layer comprises the solid electrolyte defined in claim 1.

7. The all-solid sodium battery according to claim 6, wherein the positive electrode comprises a metal sulfide as a positive electrode active material, and the negative electrode comprises an Na alloy as a negative electrode active material.

* * * * *